(12) United States Patent
Endo et al.

(10) Patent No.: US 6,670,946 B2
(45) Date of Patent: Dec. 30, 2003

(54) COORDINATES INPUT APPARATUS

(75) Inventors: Michiko Endo, Shinagawa (JP); Takashi Arita, Shinagawa (JP)

(73) Assignee: Fujitsu Takamisawa Component Ltd., Tokyo (JP)

( * ) Notice: Subject to any disclaimer, the term of this patent is extended or adjusted under 35 U.S.C. 154(b) by 229 days.

(21) Appl. No.: 09/828,822

(22) Filed: Apr. 10, 2001

(65) Prior Publication Data

US 2002/0054012 A1 May 9, 2002

(30) Foreign Application Priority Data

Nov. 9, 2000 (JP) .................................. 2000-342411

(51) Int. Cl.[7] ............................................... G09G 5/08
(52) U.S. Cl. ..................................... 345/160; 345/161
(58) Field of Search ................................ 345/157–160, 345/161, 184; 273/148, 149; 74/471 XY; 341/20; 200/6 A

(56) References Cited

U.S. PATENT DOCUMENTS 5,504,502 A * 4/1996 Arita et al.
5,508,719 A * 4/1996 Gervais
5,714,980 A * 2/1998 Niino
6,043,806 A * 3/2000 Atwell et al.
6,266,046 B1 * 7/2001 Arita

OTHER PUBLICATIONS

U.S. patent application Ser. No. 09/865707, Endo, filed May 2001.*

* cited by examiner

*Primary Examiner*—Regina Liang
(74) *Attorney, Agent, or Firm*—Staas & Halsey LLP

(57) ABSTRACT

A coordinates input apparatus for designating a particular set of coordinates in three-dimensional space, the coordinates input apparatus includes a substantially box-like frame, an operating part tiltably positioned within the frame, a printed circuit board supporting the frame, a magnet, a plurality of magnetoelectric transducers and a magnetic plate. The magnet and the plurality of magnetoelectric transducers are fixedly mounted on an upper surface of the printed circuit board opposite the magnetic plate, the magnet is disposed so that one pole faces the magnetic plate, the magnetic plate is disposed on a lower surface of the operating part opposite the magnet and tiltably supported by the frame via the operating part, the plurality of magnetoelectric transducers are disposed around an outer rim of the magnet and output voltage signals indicating voltage values that vary according to a change in distance between the magnetoelectric transducers and the magnetic plate, such that the voltage signals indicate a set of coordinates in three-dimensional space.

24 Claims, 13 Drawing Sheets

COORDINATES INPUT APPARATUS

BACKGROUND OF THE INVENTION

1. Field of the Invention

The present invention relates to an improved coordinates input apparatus, and more particularly, to a pointing apparatus that can be used without the need for special operating space.

2. Description of Related Art

In recent years, easy-to-operate pointing apparatus have come to be widely used instead of keyboards as an input means for computers and the like.

For example, a mouse or a digitizer can be used with desktop computers and the like.

However, the laptop and other portable computers that have become popular in recent years are often used outdoors, in vehicles, and so forth, that is, in locations where there is no flat surface on which to rest the computer. As a result, there is often little or no space in which to operate a pointing apparatus such as a mouse or digitizer. Additionally, as portable computers have become more compact the need for the pointing apparatus to become smaller has grown as well.

Additionally, cellular telephones have come to be equipped with a pointing apparatus. Given the small size of cell phones, the pointing apparatuses used on these devices are required to be even smaller than those used on portable computers and the like.

In response to such requirements, a pointing apparatus that tilts when pressed and the angle of tilt sensed has been suggested as one type of suitable pointing apparatus that is compact and requires very little space to operate.

A description of such a conventional compact pointing apparatus will now be given with reference to FIGS. 1, 2, 3 and 4.

FIG. 1 is a diagram showing a front cross-sectional view of a conventional pointing apparatus illustrating a state in which the key top operating portion of the apparatus is substantially vertical. FIG. 2 is a diagram showing a front cross-sectional view of a conventional pointing apparatus illustrating a state in which the key top operating portion of the apparatus is tilted. FIG. 3 is a diagram illustrating a spatial relation between a magnet and a magnetoelectric transducer of the pointing apparatus shown in FIGS. 1 and 2. FIG. 4 is a diagram showing a side view of the magnet and magnetoelectric transducer of FIG. 3.

According to the conventional art, a pointing apparatus 1 comprises an operating part 2, a pressure part 3 and a coordinates sensor 4.

The operating part 2 comprises a key top 2a, a stick 2b fixedly mounted to one end part of the key top 2a, and a holder 2c composed of two halves that form a sphere when joined together.

The pressure part 3 comprises a slider 3a movable in a vertical direction along a frame 5 and a coil spring 3b that continuously presses the slider 3a in a downward direction.

The coordinates sensor 4 comprises a magnet 4a provided on an interior of the holder 2c and a plurality of magneto-electric transducers 4b mounted on a printed circuit board 6 bonded to a bottom surface of the frame 5, the magneto-electric transducers 4b being recessedly mounted in a bottom surface of the holder 2c. It should be noted that there are actually four magnetoelectric transducers 4b-1 through 4b-4 displaced a certain distance from the center line of the magnet 4a, as can be seen in FIG. 3.

In the pointing apparatus 1 having the structure described above, pressing and moving the key top 2a manually slides the slider 3a upward against the spring force of the coil spring 3b and, as shown in FIG. 2, the stick 2b is tilted in a given direction. At this time, the magnet 4a built into the holder 2c is tilted with respect to the magnetoelectric transducer 4b mounted on the printed circuit board 6.

Then, by releasing the key top 2a, the spring force of the compressed coil spring 3b returns the key top 2a to an original position before it was manipulated, thus returning the positional relation between the magnet 4a and the magnetoelectric transducer 4b to an initial state as well.

A description will now be given of the principle upon which the coordinates detector of the pointing apparatus 1 operates.

In a case in which the stick 2b is perpendicular to the printed circuit board 6 as shown in FIG. 1, as shown by the solid line in FIG. 4 the magnet 4a is separated from the four magnetoelectric transducers 4b (shown as 4b-1 through 4b-4 in FIG. 3) by a certain distance, and accordingly the magnetic field imparted to the magnetoelectric transducers 4b-1 through 4b-4 is essentially equal, so that for example, if the direction from which the magnetic field is sensed is perpendicular to the printed circuit board 6, then the sensed magnetic field direction components B1 through B4 of the magnetic flux density through the magnetoelectric transducers 4b-1 through 4b-4 would be substantially equal, and thus the output voltage of the magnetoelectric transducers would also be essentially equal.

By contrast, if the stick 2b is tilted with respect to the printed circuit board 6 as shown in FIG. 2, then the distance separating the magnet 4a from the magneto-electric elements 4b changes as indicated by the dashed line in FIG. 4. In the case of FIG. 4, the magnet 4a simultaneously approaches the magnetoelectric transducer 4b-1 and moves further away from the magnetoelectric transducer 4b-3, so the sensed magnetic field direction component B1 increases while the sensed magnetic field direction component B3 decreases and the output voltages from the magnetoelectric transducers 4b-1 and 4b-3 change as well, with an angle of inclination θ of the key top 2a deduced from a calculation of the difference in output between the magnetoelectric transducers 4b-1 and 4b-3 and further converted into an X-axis coordinate value for the purpose of moving a cursor on a display (coordinate space). Similarly, by calculating the difference in output voltages between the magnetoelectric transducers 4b-2 and 4b-4 the angle of inclination θ of the key top 2a can be converted in a Y-axis coordinate value. That is, XY coordinate values can be obtained when the stick 2b tilts in a given direction based on the direction and angle of that tilt. These XY coordinates are input into a computer and the direction, extent and speed of movement of the pointer or cursor then displayed on the display.

However, with the conventional pointing apparatus as described above, efforts to further miniaturize the pointing apparatus such as for example by shrinking the magnet and magnetoelectric transducers, has diminished the strength of the magnetic field generated and has led to a situation in which dimensional tolerances in the magnetoelectric transducers show up as unevenness in the performance of the finished apparatus with increased frequency, which is undesirable. Additionally, other measures to reduce the size of the pointing apparatus such as, for example, reducing the distance between the magnet and the magnetoelectric transducers and reducing the distance between each of the plurality of magnetoelectric transducers, has led to a situation in which the magnet and the magnetoelectric transducers physically interfere with each other, that is, the magnet collides with the magnetoelectric transducer when the magnet is tilted during operation of the pointing apparatus.

Accordingly, there are physical limitations to the reduction in the size of the components of the pointing apparatus attendant upon efforts to make personal computers, cell phones and the like more compact.

BRIEF SUMMARY OF THE INVENTION

Accordingly, it is an object of the present invention to provide an improved and useful coordinates input apparatus in which the above-described disadvantage is eliminated, and more specifically, to provide an improved and useful coordinates input apparatus capable of accommodating further reductions in size.

The above-described object of the present invention is achieved by a coordinates input apparatus for designating a particular set of coordinates in three-dimensional space, the coordinates input apparatus comprising:

a substantially box-like frame;

an operating part tiltably positioned within the frame;

a printed circuit board supporting the frame;

a magnet;

a plurality of magnetoelectric transducers; and a magnetic plate, the magnet and the plurality of magnetoelectric transducers fixedly mounted on an upper surface of the printed circuit board opposite the magnetic plate, the magnet disposed so that one pole faces the magnetic plate, the magnetic plate disposed on a lower surface of the operating part opposite the magnet and tiltably supported by the frame via the operating part, the plurality of magnetoelectric transducers disposed around an outer rim of the magnet and outputting voltage signals indicating voltage values that vary according to a change in distance between the magnetoelectric transducers and the magnetic plate, such that the voltage signals indicate a set of coordinates in three-dimensional space.

According to this aspect of the invention, the coordinates input apparatus can be made thinner and more compact than is the case with the conventional art.

Other objects, features and advantages of the present invention will become more apparent from the following detailed description when read in conjunction with the accompanying drawings.

DETAILED DESCRIPTION OF THE INVENTION

A description will now be given of embodiments of the present invention, with reference to the accompanying drawings. It should be noted that identical or corresponding elements in the embodiments are given identical or corresponding reference numbers in all drawings, with detailed descriptions of such elements given once and thereafter omitted.

At the outset, it should be noted that the magnetic plates are yokes made of a flexible magnetic material.

Additionally, it should be noted that the sets of coordinates include both two-dimensional (that is, XY coordinates) as well as three-dimensional (XYZ) coordinates.

Additionally, it should be noted that the basic operating principles of the coordinates input apparatus according to the present invention are essentially identical to that governing the conventional art as described above, so a detailed description thereof shall be omitted.

A description will now be given of a coordinates input apparatus according to a first embodiment of the present invention, with reference to the accompanying drawings.

Figure 5:
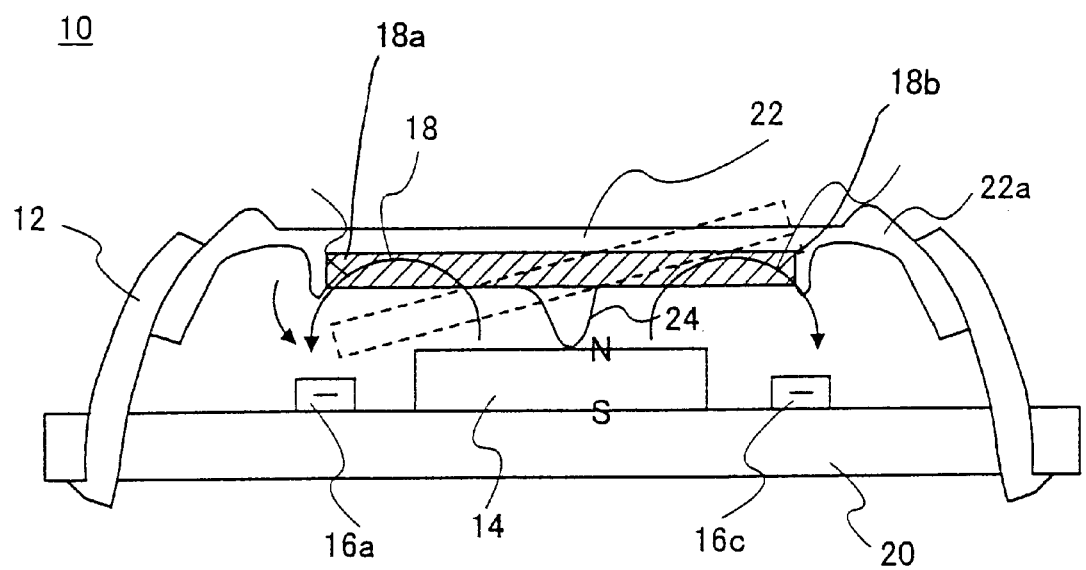
FIG. 5 is a front cross-sectional view of a coordinates input apparatus according to a first embodiment of the present invention.

FIG. 5 is a front cross-sectional view of a coordinates input apparatus according to a first embodiment of the present invention.

Figure 1:
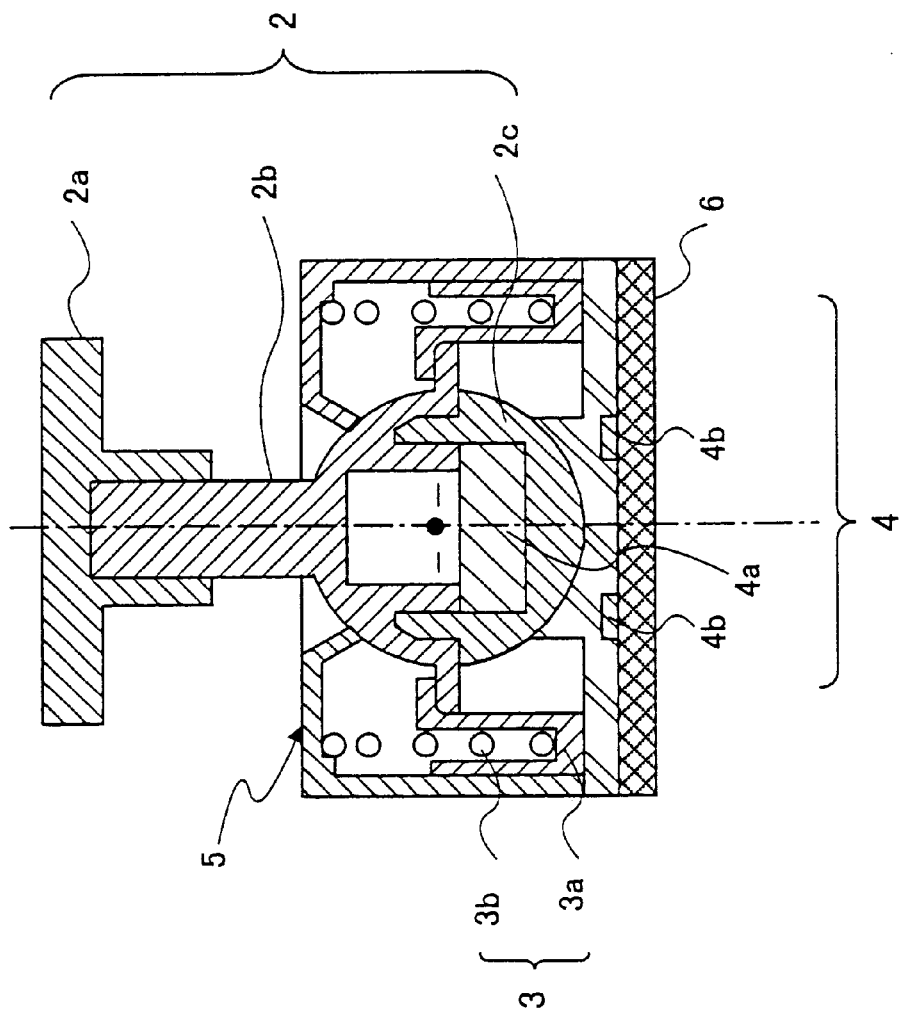
FIG. 1 is a diagram showing a front cross-sectional view of a conventional pointing apparatus illustrating a state in which the key top operating portion of the apparatus is substantially vertical.
Figure 2:
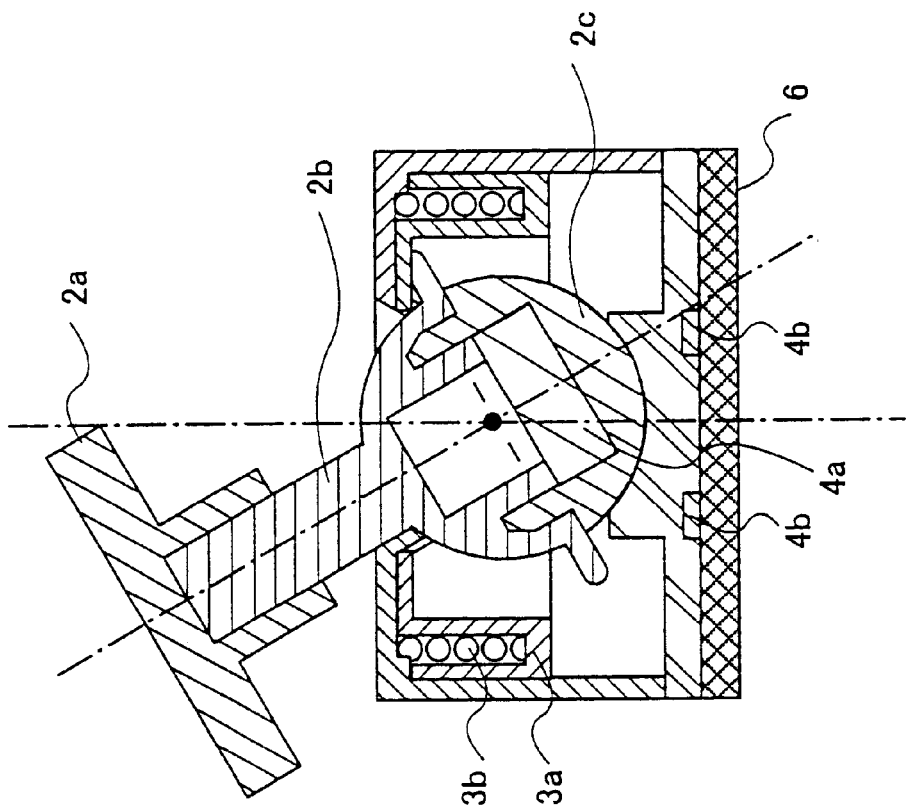
FIG. 2 is a diagram showing a front cross-sectional view of a conventional pointing apparatus in order to describe a state in which the key top operating portion of the apparatus is tilted.
Figure 3:
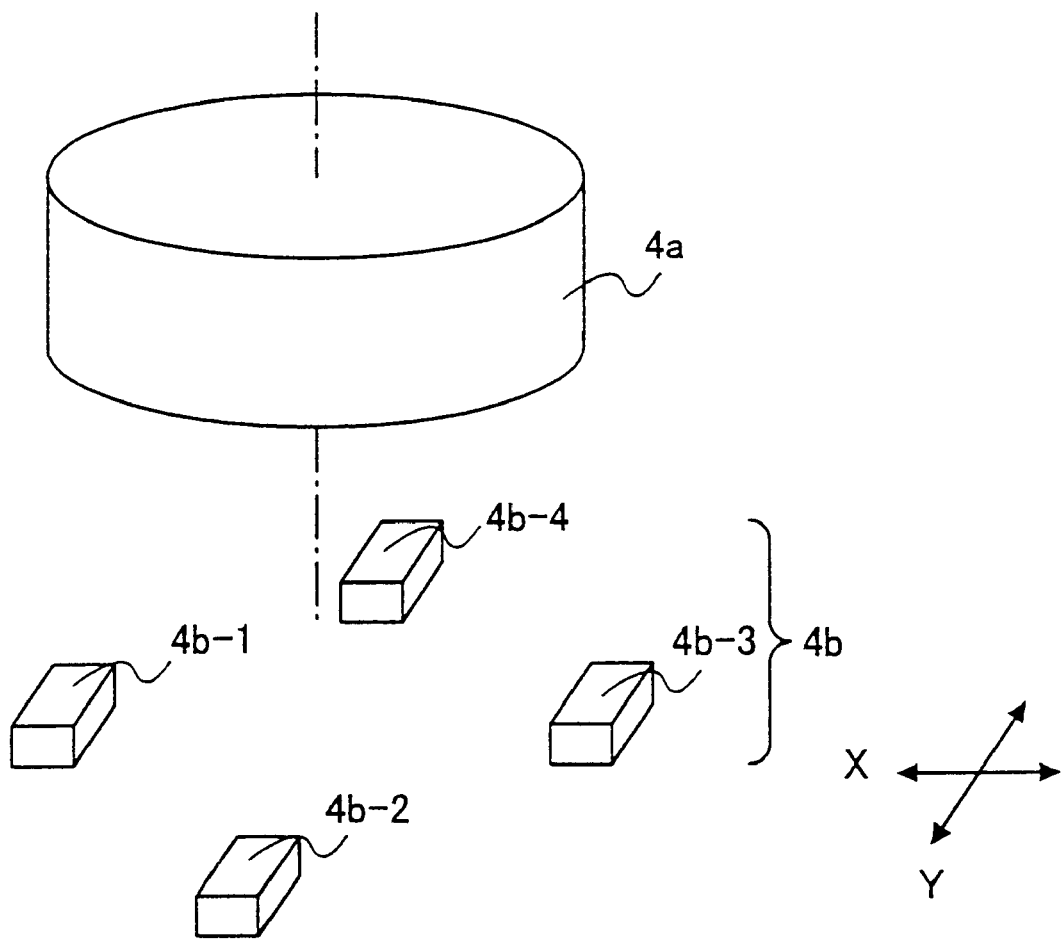
FIG. 3 is a diagram illustrating a spatial relation between a magnet and a magnetoelectric transducer of the pointing apparatus shown in FIGS. 1 and 2.
Figure 4:
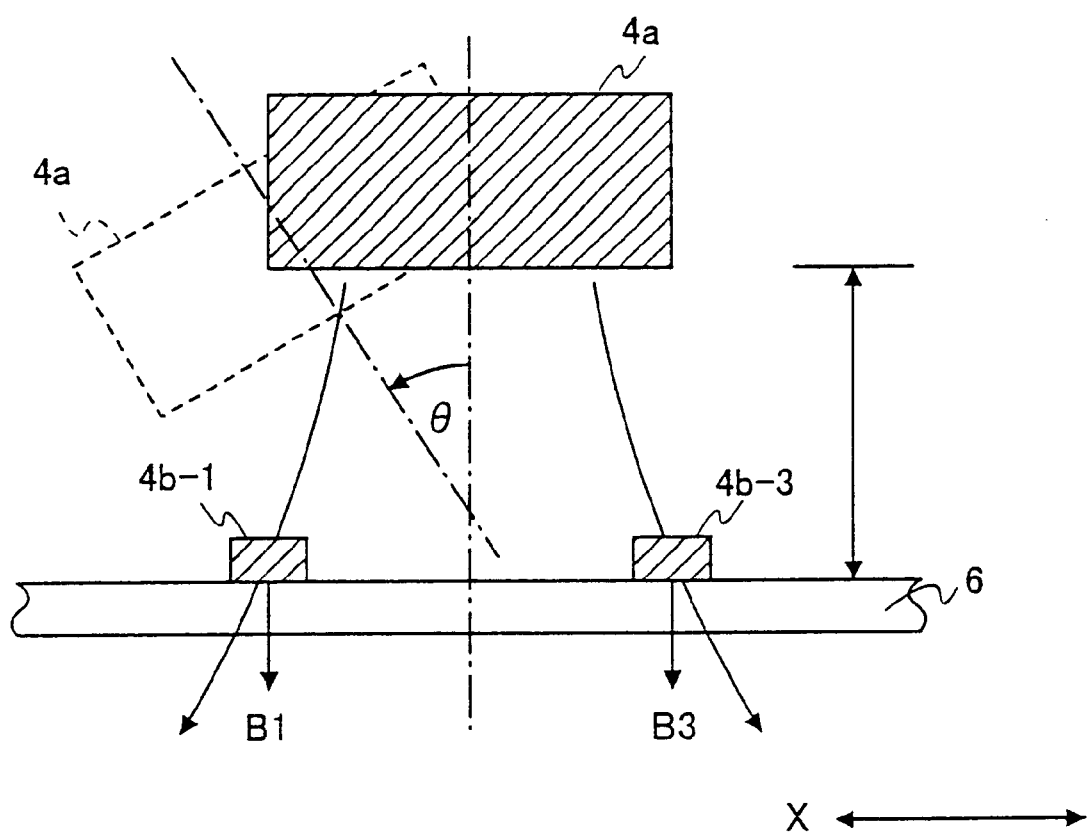
FIG. 4 is a diagram showing a side view of the magnet and magnetoelectric transducer of FIG. 3.

As shown in the diagram, the coordinates input apparatus 10 according to the first embodiment of the present invention comprises a frame 12, a magnet 14, four magnetoelectric transducers 16a, 16b, 16c and 16d (16b and 16d not, however, shown in the diagram; refer instead to magnetoelectric transducers 4b-1 through 4b-4 shown in FIG. 3), and a magnetic plate 18, hereinafter referred to as a first magnetic plate 18.

The magnet 14 is shaped substantially in the form of a cylinder, and is mounted atop a printed circuit board 20 that also functions as a floor surface of the frame 12.

In this case, the magnet 14 is disposed so that a North magnet pole N faces toward the top of FIG. 5.

The magnetoelectric transducers 16a, 16b, 16c and 16d are Hall elements, and are disposed atop the printed circuit board 20 around the periphery of the magnet 14 but at a distance from the periphery of the magnet 14.

The first magnetic plate 18 is formed substantially in the shape of a thin magnetic disc made of a flexible magnetic material, and is disposed opposite and above the magnet 14 and the magnetoelectric transducers 16a, 16b, 16c and 16d. The first magnetic plate 18 is fixedly attached to a bottom surface of an operating part 22. The operating part 22 is shaped substantially in the form of a disk, with an outer peripheral rim 22a thereof bent downward so as to extend toward the magnetoelectric transducers 16a, 16b, 16c and 16d without, however, actually contacting the magnetoelectric transducers 16a, 16b, 16c and 16d. Additionally, a support 24 that forms a portion of the operating part 22 is fixedly attached to a central portion of the bottom surface of the magnetic plate 18, a lower edge of the support 24 contacting a top surface of the magnet 14. The operating part 22 is supported by the support 24 so as to be slidable along the frame 12, that is, tiltable in any direction.

In the coordinates input apparatus 10 having the structure described above, a magnetic flux generated from the magnet 14 is conducted by the first magnetic plate 18 to the magnetoelectric transducers 16a, 16b, 16c and 16d.

Accordingly, by tilting the operating part 22 in a desired direction and placing the magnetic plate 18 in a tilted state so as to specify a set of coordinates, a larger magnetic flux is conducted by one end portion 18a of the first magnetic plate 18 approaching the North magnetic pole surface of the magnet 14 to the magnetoelectric transducer 16a located beneath the magnetic plate portion 18a. Conversely, another end portion 18b of the magnetic plate 18 that is opposite the end portion 18a described above is tilted upward and away from the North magnetic pole surface, so a relatively reduced output is obtained from the magnetoelectric transducer 16c located beneath the end portion 18b as compared to before the magnetic plate was tilted. By determining the difference in output between the two magnetoelectric transducers 16a and 16c the angle of inclination θ1 of the magnetic plate 18 can be determined, and from the angle of inclination θ1 the direction, angle and speed of movement of the cursor or pointer can be determined.

Compared to the conventional art, the coordinates input apparatus 10 described above, merely by the addition of the first magnetic plate 18 which does however increase the size of the coordinates input apparatus, nevertheless results in a reduction in the overall size and particularly the thickness of the unit in which it is inserted because (1) the magnet 14 and the magnetoelectric transducers 16a, 16b, 16c and 16d are provided on the same surface of the printed circuit board 20, and (2) the magnetic plate 18 itself is thin.

Additionally, the coordinates input apparatus 10 described above can utilize compact, inexpensive Hall elements for the magnetoelectric transducers 16a, 16b, 16c and 16d, thus making it possible to produce a compact coordinates input apparatus at low cost.

A description will now be given of a coordinates input apparatus according to a second embodiment of the present invention, with reference to FIGS. 6 and 7.

Figure 6:
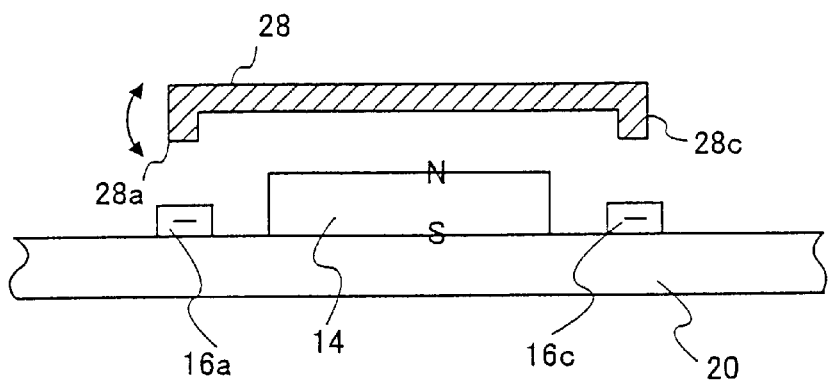
FIG. 6 is a front cross-sectional view of a coordinates input apparatus according to a second embodiment of the present invention.
Figure 7:
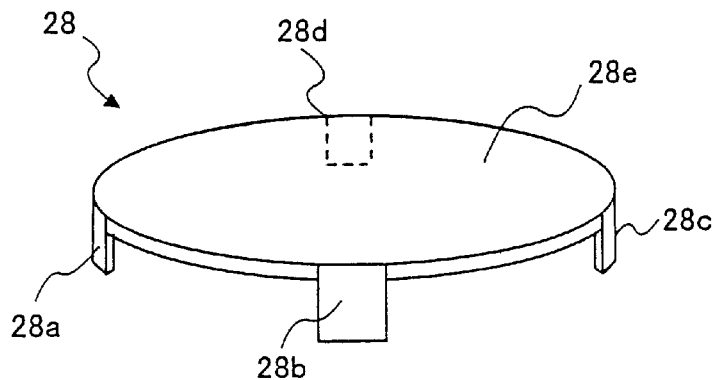
FIG. 7 is a perspective view of a magnetic plate used in the coordinates input apparatus according to a second embodiment of the present invention.

FIG. 6 is a front cross-sectional view of a coordinates input apparatus according to a second embodiment of the present invention. FIG. 7 is a perspective view of a magnetic plate used in the coordinates input apparatus according to a second embodiment of the present invention.

As can be seen from the diagrams, the coordinates input apparatus 26 according to the second embodiment of the present invention has essentially the same basic structure as the coordinates input apparatus 10 according to the first embodiment of the present invention as described above.

The main difference between the first and second embodiments is that in the latter, the first magnetic plate 28 is provided with four projecting flange portions 28a, 28b, 28c and 28d on a peripheral rim of the first magnetic plate 28 bent at right angles to the plate 28, the flanges extending toward the magnetoelectric transducers 16a, 16b, 16c and 16d without actually contacting the magnetoelectric transducers 16a, 16b, 16c and 16d.

In the coordinates input apparatus 26 having the structure described above, because the four flanges 28a, 28b, 28c and 28d are positioned closer to the magnetoelectric transducers 16a, 16b, 16c and 16d than the other parts of the rim of the first magnetic plate 28, any difference in output is magnified and so it is possible to reduce the size of the magnet 14.

A description will now be given of a coordinates input apparatus according to a third embodiment of the present invention, with reference to FIG. 8.

Figure 8:
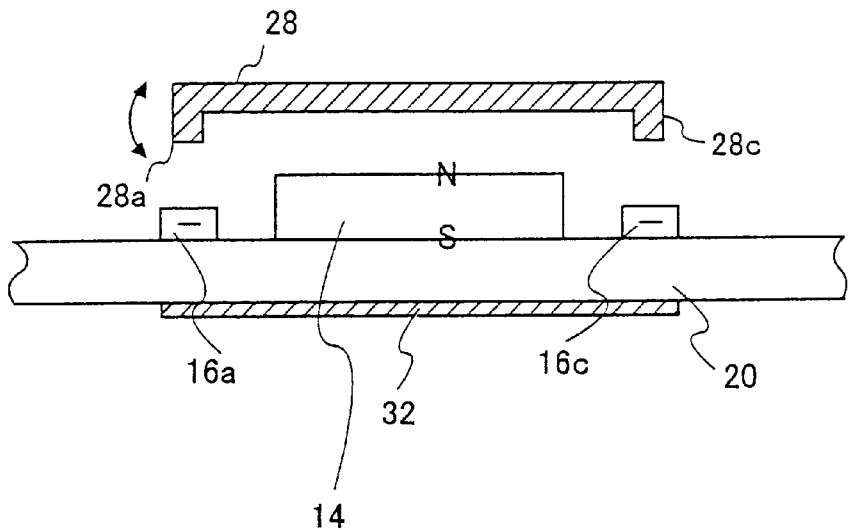
FIG. 8 is a front cross-sectional view of a coordinates input apparatus according to a third embodiment of the present invention.

FIG. 8 is a front cross-sectional view of a coordinates input apparatus according to a third embodiment of the present invention.

As can be seen from the diagram, the coordinates input apparatus 30 according to the third embodiment of the present invention has a basic structure that is essentially the same as that of the coordinates input apparatus 26 according to the second embodiment of the present invention as described above.

The main difference between the second and third embodiments is that in the latter, a second magnetic plate 32 is provided on a back surface of the printed circuit board 20 mounting the magnetoelectric transducers 16a, 16b, 16c and 16d and the magnet 14.

In the coordinates input apparatus 30 having the structure described above, most of the magnetic flux generated between the North and South magnetic poles on the top and bottom of the magnet 14 is enclosed within the projected space between the magnetic plates 28, 32 and imparted to the magnetoelectric transducers 16a, 16b, 16c and 16d, so a smaller magnet 14 can be used to obtain a given output.

A description will now be given of a coordinates input apparatus according to a fourth embodiment of the present invention, with reference to FIG. 9.

Figure 9:
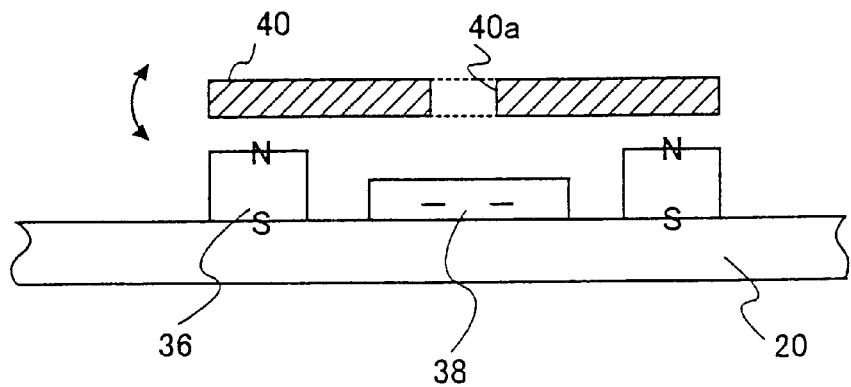
FIG. 9 is a front cross-sectional view of a coordinates input apparatus according to a fourth embodiment of the present invention.

FIG. 9 is a front cross-sectional view of a coordinates input apparatus according to a fourth embodiment of the present invention.

As can be seen from the diagram, the coordinates input apparatus 34 according to the fourth embodiment of the present invention comprises a frame (not, however, shown in the diagram), a magnet 36, four magnetoelectric transducers (not shown in the diagram), and a first magnetic plate 40, and therefore has essentially the same basic structural elements as the coordinates input apparatus 10 according to the first embodiment of the present invention as described above.

The coordinates input apparatus 34 according to the fourth embodiment differs from the coordinates input apparatus 10 according to the first embodiment insofar as the coordinates input apparatus 34 according to the fourth embodiment has a magnet 36 that is substantially annular in shape. Additionally, in contrast to the coordinates input apparatus 10 according to the first embodiment, in which the four magnetoelectric transducers 16a, 16b, 16c and 16d are separated from each other, the four magnetoelectric transducers 16a, 16b, 16c and 16d of the coordinates input apparatus 34 are accommodated within a package 38. Additionally, the magnetic plate 40 is substantially disc-shaped, with an aperture 40a located in a center thereof.

Additionally, the coordinates input apparatus 34 differs from the coordinates input apparatus 10 in that the package 38 that accommodates the four magnetoelectric transducers 16a, 16b, 16c and 16d is located inboard of the magnet 36, whereas in the coordinates input apparatus 10 the four magnetoelectric transducers 16a, 16b, 16c and 16d are located outside the magnet 14.

In the coordinates input apparatus 34 having the structure described above, because the package 38 is positioned inboard of the magnet 36 the coordinates input apparatus 34 as a whole can be made more compact than the conventional unit.

A description will now be given of a coordinates input apparatus according to a fifth embodiment of the present invention, with reference to FIGS. 10 and 11.

Figure 10:
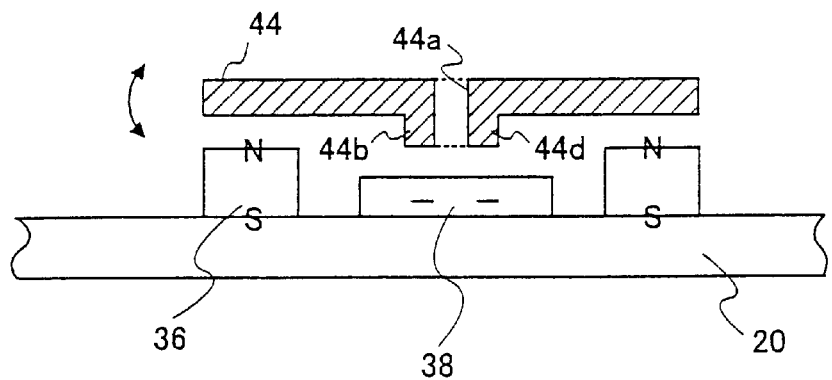
FIG. 10 is a front cross-sectional view of a coordinates input apparatus according to a fifth embodiment of the present invention.
Figure 11:
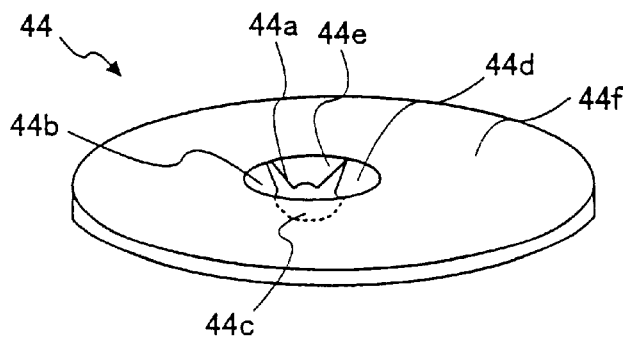
FIG. 11 is a perspective view of a magnetic plate used in the coordinates input apparatus according to a fifth embodiment of the present invention.

FIG. 10 is a front cross-sectional view of a coordinates input apparatus according to a fifth embodiment of the present invention. FIG. 11 is a perspective view of a magnetic plate used in the coordinates input apparatus according to a fifth embodiment of the present invention.

As can be seen from the diagrams, the coordinates input apparatus 42 according to the fifth embodiment of the present invention has a basic structure that is essentially the same as that of the coordinates input apparatus 34 according to the second embodiment of the present invention as described above.

However, the coordinates input apparatus 42 according to the fifth embodiment differs from the coordinates input apparatus 34 according to the second embodiment insofar as, in the former, four distinct flanges 44b–44e bent downward so as to project toward the package 38 without actually contacting the package 38 are formed along the rim of the aperture 44a of the disc-shaped magnetic plate 44.

In the coordinates input apparatus 42 having the structure described above, a relatively large differential output signal can be obtained because the flanges 44b–44e are positioned closer to the package 38 than other parts of the disc-shaped magnetic plate 44, and thus a smaller magnet 36 can be used to obtain a given output.

A description will now be given of a coordinates input apparatus according to a sixth embodiment of the present invention, with reference to FIG. 12.

Figure 12:
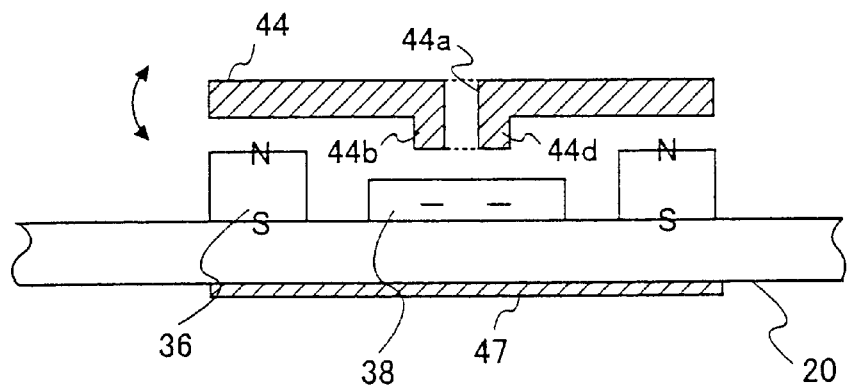
FIG. 12 is a front cross-sectional view of a coordinates input apparatus according to a sixth embodiment of the present invention.

FIG. 12 is a front cross-sectional view of a coordinates input apparatus according to a sixth embodiment of the present invention.

As can be seen from the diagrams, the coordinates input apparatus 46 according to the fifth embodiment of the present invention has a basic structure that is essentially the same as that of the coordinates input apparatus 42 according to the fifth embodiment of the present invention as described above.

However, the coordinates input apparatus 46 according to the sixth embodiment differs from the coordinates input apparatus 42 according to the fifth embodiment insofar as, in the former, a second magnetic plate 47 is provided on a back surface of the printed circuit board 20 mounting the package 38 and the magnet 36.

In the coordinates input apparatus 46 having the structure described above, most of the magnetic flux generated from the North and South magnetic poles of the magnet 36 is contained within the projected space between the first and second magnetic bodies 44, 47 and imparted to the package 38, so a smaller magnet 36 can be used to obtain a given output.

A description will now be given of a coordinates input apparatus according to a seventh embodiment of the present invention, with reference to FIG. 13.

Figure 13:
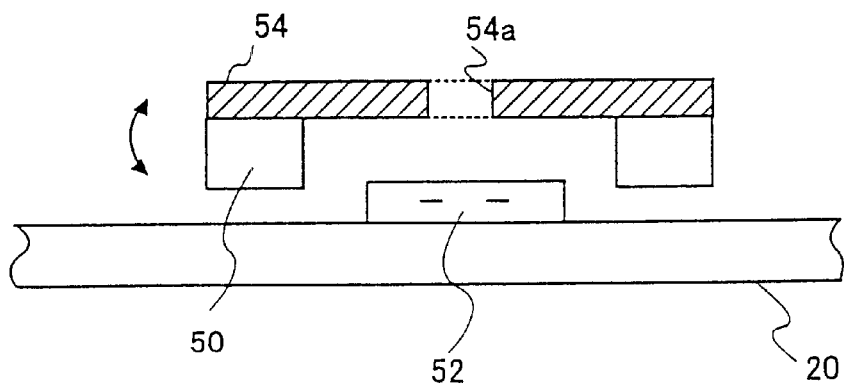
FIG. 13 is a front cross-sectional view of a coordinates input apparatus according to a seventh embodiment of the present invention.

FIG. 13 is a front cross-sectional view of a coordinates input apparatus according to a seventh embodiment of the present invention.

Insofar as the coordinates input apparatus 48 according to the seventh embodiment of the present invention comprises a frame (not shown in the diagram), a magnet 50, a package 52 accommodating four magnetoelectric transducers (not shown in the diagram) and a second magnetic plate 50, the coordinates input apparatus 48 according to the seventh embodiment has the same basic structure as that of the coordinates input apparatus 34 according to the fourth embodiment.

However, the coordinates input apparatus 48 according to the seventh embodiment differs from the coordinates input apparatus 34 according to the fourth embodiment insofar as, in the former, the magnet 50 is annular in shape and provided on a bottom of a disc-shaped magnetic plate 54 having an aperture 54a in the center thereof such that one of the magnetic poles is disposed opposite the printed circuit board 20 mounting the package 52. It should be noted that the package 52 is positioned within a projected area inboard of the magnet 50.

In the coordinates input apparatus 48 having the structure described above, the magnet 50 can be made thinner than is the case with the conventional coordinates input apparatus which has no disc-shaped magnetic plate 54.

A description will now be given of a coordinates input apparatus according to an eighth embodiment of the present invention, with reference to FIG. 14.

Figure 14:
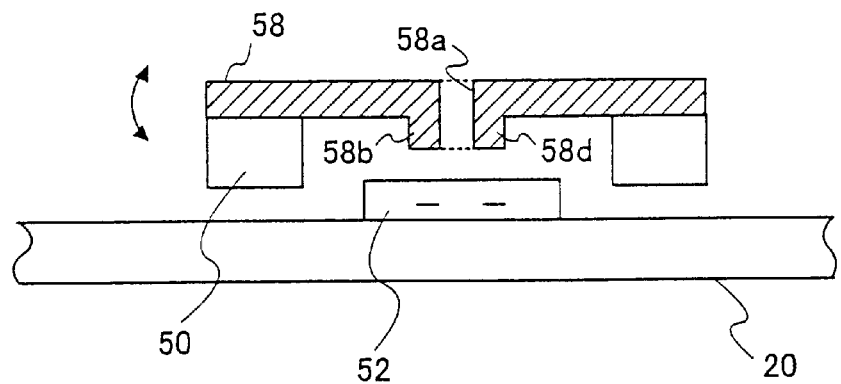
FIG. 14 is a front cross-sectional view of a coordinates input apparatus according to an eighth embodiment of the present invention.

FIG. 14 is a front cross-sectional view of a coordinates input apparatus according to an eighth embodiment of the present invention.

As can be seen from the diagram, a coordinates input apparatus 56 according to an eighth embodiment of the present invention has a basic structure that is essentially the same as that of the coordinates input apparatus 48 according to the seventh embodiment of the present invention as described above.

However, the coordinates input apparatus 56 according to the eighth embodiment differs from the coordinates input apparatus 48 according to the seventh embodiment insofar as, in contrast to the second magnetic plate 54 of the latter, in the former four distinct flanges 58b–58e (though only 58b and 58d are shown in the diagram) bent downward so as to project toward the package 38 without actually contacting the package 52 are formed along the rim of the aperture 58a of the second magnetic plate 58.

In the coordinates input apparatus 56 having the structure described above, a relatively large differential output signal can be obtained because the flanges 58b–58e are positioned closer to the package 52 than other parts of the disc-shaped magnetic plate 44, and thus a smaller magnet 50 can be used to obtain a given output.

A description will now be given of a coordinates input apparatus according to a ninth embodiment of the present invention, with reference to FIG. 15.

Figure 15:
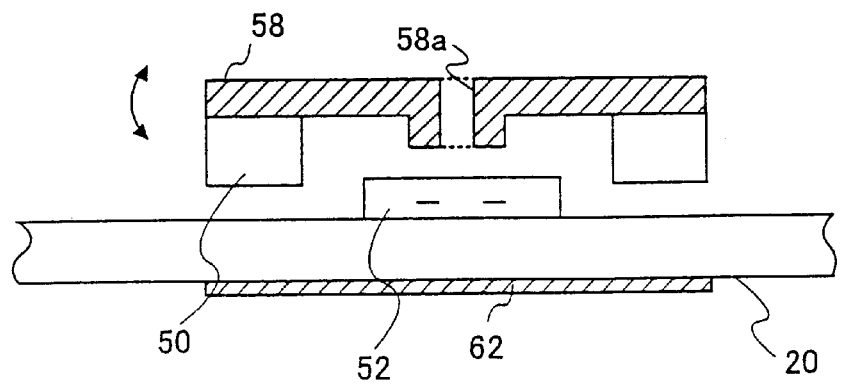
FIG. 15 is a front cross-sectional view of a coordinates input apparatus according to a ninth embodiment of the present invention.

FIG. 15 is a front cross-sectional view of a coordinates input apparatus according to a ninth embodiment of the present invention.

As can be seen from the diagram, a coordinates input apparatus 60 according to a ninth embodiment of the present invention has a basic structure that is essentially the same as that of the coordinates input apparatus 56 according to the eighth embodiment of the present invention as described above.

However, the coordinates input apparatus 60 according to the ninth embodiment differs from the coordinates input apparatus 56 according to the eighth embodiment insofar as the former provides a second magnetic plate 62 on the back surface of the printed circuit board 20 mounting the package 52.

In the coordinates input apparatus 60 having the structure described above, most of the magnetic flux generated from the North and South magnetic poles of the magnet 50 is contained within the projected space between the first and second magnetic plates 58, 62 and imparted to the package 52, so a smaller magnet 50 can be used to obtain a given output.

A description will now be given of a coordinates input apparatus according to a tenth embodiment of the present invention, with reference to FIGS. 16 and 17.

Figure 16:
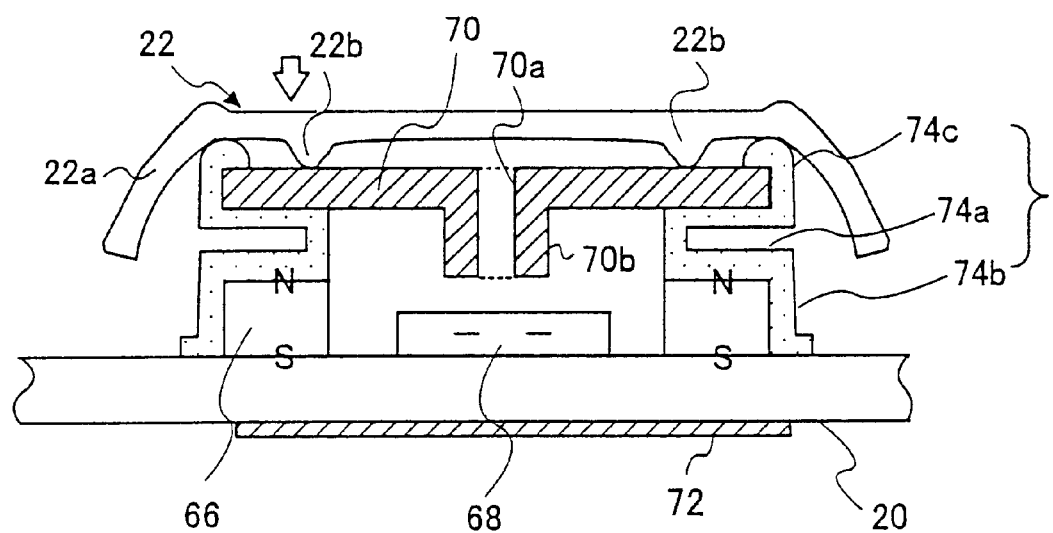
FIG. 16 is a front cross-sectional view of a coordinates input apparatus according to a tenth embodiment of the present invention.
Figure 17:
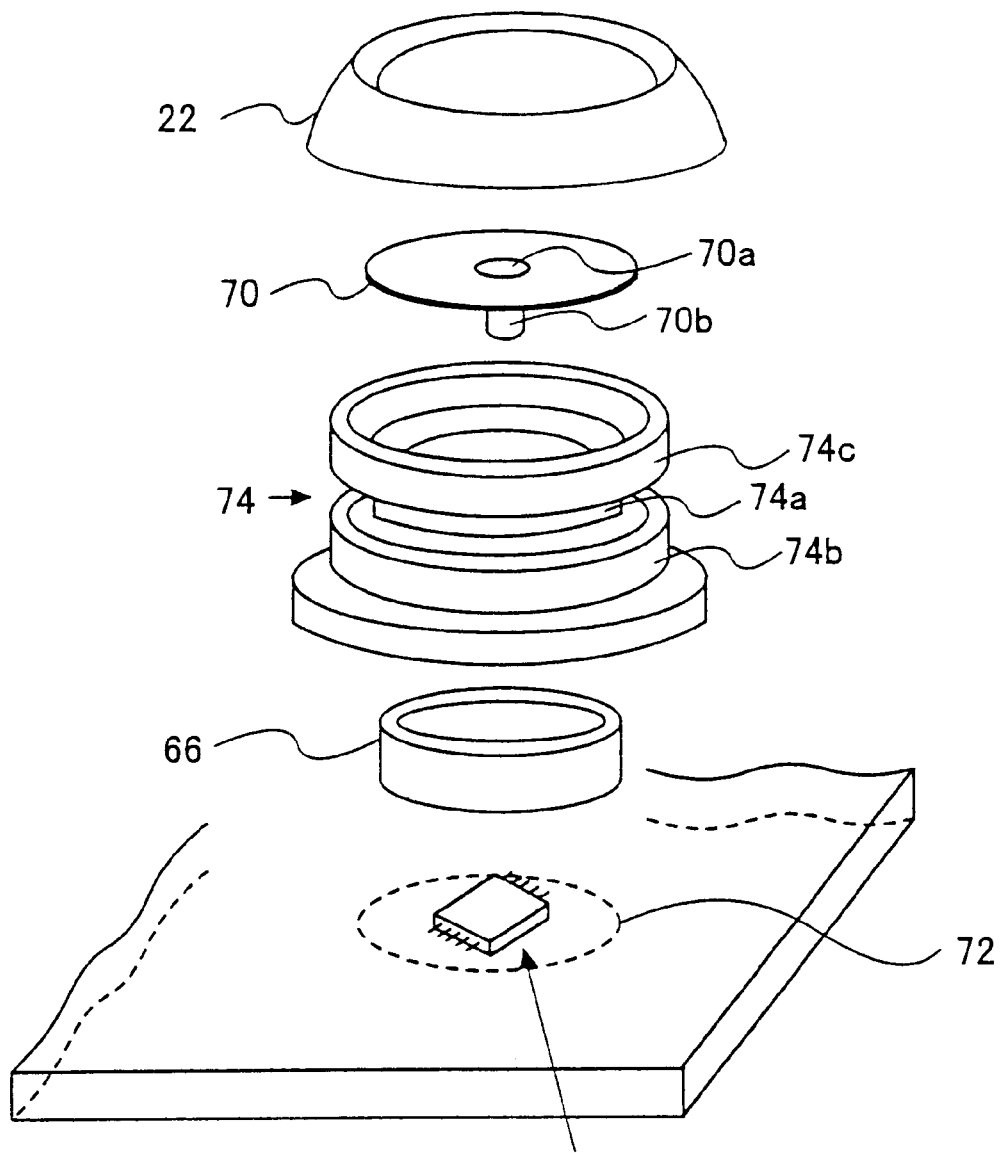
FIG. 17 is an exploded perspective view of the coordinates input apparatus according to the tenth embodiment of the present invention.

FIG. 16 is a front cross-sectional view of a coordinates input apparatus according to a tenth embodiment of the present invention. FIG. 17 is an exploded perspective view of a coordinates input apparatus according to a tenth embodiment of the present invention.

As shown in the diagrams, a coordinates input apparatus 64 according to the tenth embodiment of the present invention comprises a magnet 66, four Hall elements as magnetoelectric transducers (not shown in the diagrams) accommodated within a package (an integrated Hall element) 68, a first magnetic plate 70 and a second magnetic plate 72. Further, the first magnetic plate 70 is tiltably supported by an elastic supporting member 74 made of an elastomer material, the elastic supporting member 74 also forming a frame that accommodates the magnet 66 and so forth.

The magnet 66 is substantially annular in shape, and mounted on the printed circuit board so that the North magnetic pole surface faces upward. The package 68 is mounted on the printed circuit board 20 inboard of the magnet 66.

The second magnetic plate 72 is fixedly mounted on the back of the printed circuit board 20.

The elastic supporting member 74 is a substantially annular member in shape, having a flexible intermediate portion 74a, an upper edge portion 74c and a lower edge portion 74b that covers the magnet 66 and a portion of the printed circuit board 74b, the lower edge portion 74b being fixedly mounted on the printed circuit board 20 and the magnet 66.

The first magnetic plate 70 is fixedly mounted on the upper edge 74c of the elastic member 74. The first magnetic plate 70 is substantially disc-shaped, with a cylinder extending perpendicularly downward from a rim of an aperture portion 70a in a center of the disc-shaped first magnetic plate 70. Rim 70b is positioned so as to be near the package 68.

The substantially disk-shaped operating part 22 is mounted on the top surface of the first magnetic plate 70 so as to contact a projecting rim portion 22b. An outer rim portion 22a of the substantially disk-shaped operating part 22 is bent so as to project downward and is fixedly mounted on the upper edge 74c of the elastic supporting member 74.

In the coordinates input apparatus 64 having the structure described above, pressing an upper rim of the substantially disk-shaped operating part 22 causes the flexible intermediate portion 74a of the elastic supporting member 74 to bend, enabling the substantially disk-shaped operating part 22 to tilt in any direction. Additionally, by releasing the substantially disk-shaped operating part 22, a restorative spring force of the flexible intermediate portion 74a of the elastic supporting member 74 causes the substantially disk-shaped operating part 22 to return to a horizontal position.

A more detailed description will now be given of the coordinates input apparatus 64.

The magnet 66 is a ferrite magnet, the first magnetic plate 70 is made of soft iron and has a thickness of approximately 0.5 mm, an outer diameter of 12 mm $\phi$, and an inner diameter of 3 mm $\phi$, the outer peripheral rim 22a having a height of 1 mm. The first magnetic plate 70 may be made of a ferromagnetic material such as nickel, permalloy and the like, having a relative permeability of 1000$\mu$. The distance between the North magnetic pole surface of the magnet 66 and the bottom surface of the first magnetic plate 70 is 1 mm. The printed circuit board 20 is 0.6 mm thick. The second magnetic plate 72 is a disc approximately 12 mm in diameter, with a nickel plating formed on the surface of the disc to a depth of approximately 30 $\mu$m.

In the coordinates input apparatus 64 having the structure described above, tilting an operating part 22 so that a center left edge of an outer peripheral rim 22a of the first magnetic plate 70 comes approximately 0.6 mm closer to the North magnetic pole causes the Hall element to read 150 mV 0.1 T/5 V and the output differential between two opposed Hall elements to be approximately 30 mV, a level that approximates the output differential when the operating part 2 of the conventional pointing device 1 is at maximum tilt. Accordingly, the coordinates input apparatus 64 can be comparatively thinner than the conventional pointing device 1 yet still operate with the same degree of sensitivity.

A description will now be given of a coordinates input apparatus according to an eleventh embodiment of the present invention, with reference to FIG. 18.

Figure 18:
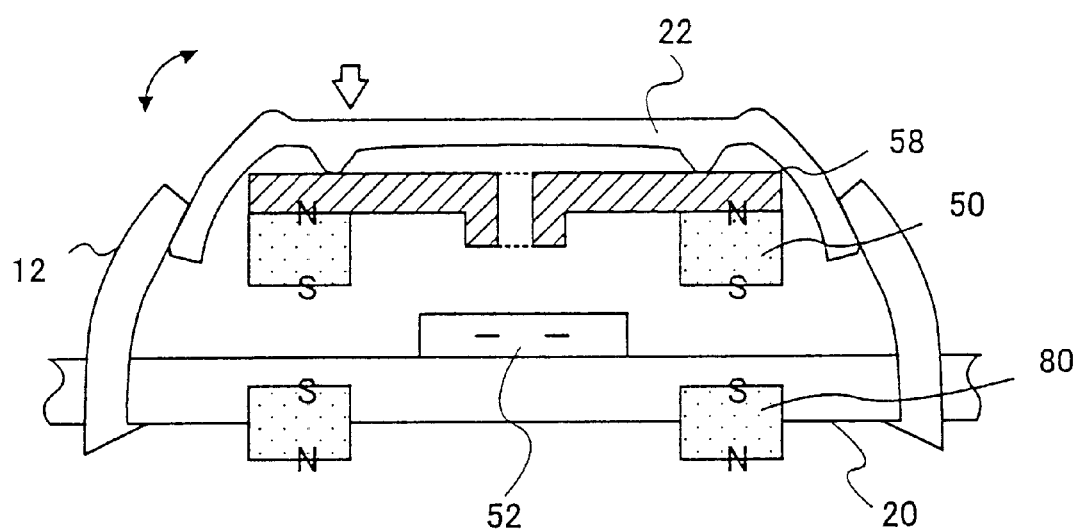
FIG. 18 is a front cross-sectional view of a coordinates input apparatus according to an eleventh embodiment of the present invention.

FIG. 18 is a front cross-sectional view of a coordinates input apparatus according to an eleventh embodiment of the present invention.

The coordinates input apparatus 78 according to the eleventh embodiment of the present invention comprises a printed circuit board 20, a package 52, a magnet 50 and a first magnetic plate 58 like those of the coordinates input apparatus 56 according to the eighth embodiment of the present invention as shown in FIG. 14. Additionally, the coordinates input apparatus 78 according to the eleventh embodiment also has an operating part 22 and a frame 12 like the coordinates input apparatus 10 according to the first embodiment of the present invention. However, the first magnetic plate 58 is not fixedly attached to the operating part 22.

As shown in the diagram, the coordinates input apparatus 78 is provided with an annular magnet 80 on the back side of the substrate 20. The magnet 80 is positioned so that the South magnetic pole faces the South magnetic pole of the magnet 50.

By controlling the distance between the magnet 50 and the magnet 80 as appropriate, then in a state in which the coordinates input apparatus 78 is not operating the repellent force arising between the magnet 50 and the magnet 80 causes the magnet 50 to rise, pushing the operating part 22 upward via the second magnetic plate 58 so that the outer peripheral rim 22a of the operating part 22 engages the frame 12.

By pressing the rim of the operating part 22 with a force sufficient to overcome the repellent force described above, the operating part 22 can be tilted in any direction. By releasing the operating part 22, the repellent force arising between the magnet 50 and the magnet 80 returns the operating part 22 to the horizontal position.

In the coordinates input apparatus 78 having the structure described above, the repellent force arising between the magnet 50 and the magnet 80 is employed as a retaining means for tiltably holding the first magnetic plate 58 within the frame 12 and the operating part 22, so the structure of the apparatus is simplified and can also be made more compact. Additionally, it can be appreciated that the unavoidable wear on the elastic supporting member produced by repeated use in a case in which an elastic supporting member is used is eliminated.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope and spirit of the present invention.

The present application is based on Japanese Priority Application No. 2000-342411, filed on Nov. 9, 2000, the contents of which are hereby incorporated by reference.

What is claimed is:

1. A coordinates input apparatus for designating a particular set of coordinates in three-dimensional space, the coordinates input apparatus comprising:

a frame;

an operating part tiltably positioned within the frame;

a printed circuit board supporting the frame;

a magnet;

a plurality of magnetoelectric transducers; and a magnetic plate, the magnet and the plurality of magnetoelectric transducers being fixedly mounted on an upper surface of the printed circuit board opposite, and spaced from, the magnetic plate, the magnet being disposed so that one pole faces the magnetic plate, the magnetic plate being disposed on a lower surface of the operating part opposite the magnet and tiltably supported by the frame via the operating part, the plurality of magnetoelectric transducers disposed around an outer rim of the magnet and outputting respective voltage signals having voltage values that vary according to a change in distance between each of the respective magnetoelectric transducers and the magnetic plate, such that the voltage values indicate a set of coordinates in three-dimensional space, and a plurality of projecting flanges formed around a rim of the magnetic plate and extending toward the magnetoelectric transducers without contacting the magnetoelectric transducers.

2. The coordinates input apparatus as claimed in claim 1, further comprising a second magnetic plate disposed on a lower surface of the printed circuit board opposite the upper surface of the printed circuit board on which the magnet and the plurality of magnetoelectric transducers are disposed.

3. A coordinates input apparatus for designating a particular set of coordinates in three-dimensional space, the coordinates input apparatus comprising:

a frame;

an operating part tiltably positioned within the frame;

a printed circuit board supporting the frame;

a magnet;

a plurality of magnetoelectric transducers; and a magnetic plate, the magnet and the plurality of magnetoelectric transducers being fixedly mounted on an upper surface of the printed circuit board opposite, and spaced from, the magnetic plate, the magnet being disposed so that one pole faces the magnetic plate, the magnetic plate being disposed on a lower surface of the operating part opposite the magnet and tiltably supported by the frame via the operating part, the plurality of magnetoelectric transducers disposed around an outer rim of the magnet and outputting respective voltage signals having voltage values that vary according to a change in distance between each of the respective magnetoelectric transducers and the magnetic plate, such that the voltage values indicate a set of coordinates in three-dimensional space.

4. The coordinates input apparatus as claimed in claim 3, further comprising an elastic supporting member disposed between the magnet and the magnetic plate.

5. The coordinates input apparatus as claimed in claim 3, wherein the plurality of magnetoelectric transducers are Hall elements.

6. The coordinates input apparatus as recited in claim 3, wherein:

the magnetic plate is supported by the frame so as to maintain a central portion thereof at a fixed distance from an upper surface of the magnet and tilts, relatively to the magnet, through an angle of rotation defined by the frame.

7. The coordinates input apparatus of claim 6, wherein:

the operating part includes an outer peripheral rim having an outer surface mating an inner surface of the frame and slidable therealong in accordance with the tilting of the operating part relative to the magnet and the frame, defining a restricted angle of rotation of the magnet and the operating part relative to the frame and the printed circuit board.

8. The coordinate input apparatus of claim 6, further comprising a pivotal support affixed to a central portion of the lower surface of the magnetic plate, and tiltably supporting same at the fixed distance from, and relatively to, the upper surface of the magnet.

9. A coordinates input apparatus for designating a particular set of coordinates in three-dimensional space, the coordinates input apparatus comprising:

a frame;

an operating part tiltably positioned within the frame;

a printed circuit board supporting the frame;

an annular magnet;

a plurality of magnetoelectric transducers; and a disc-shaped magnetic plate with an aperture formed in a center thereof;

the magnet and the plurality of magnetoelectric transducers being fixedly mounted on an upper surface of the printed circuit board opposite, and spaced from, the magnetic plate, the magnet being disposed so that one pole faces the magnetic plate, the magnetic plate being disposed on a lower surface of the operating part opposite the magnet and tiltably supported by the frame via the operating part, the plurality of magnetoelectric transducers mounted on the upper surface of the printed circuit board and disposed on an interior side of the magnet and outputting respective voltage signals having voltage values that vary according to a change in distance between each of the respective magnetoelectric transducers and the magnetic plate, such that the voltage values indicate a set of coordinates in three-dimensional space.

10. The coordinates input apparatus as claimed in claim 9, wherein the plurality of magnetoelectric transducers are accommodated within a package.

11. A coordinates input apparatus for designating a particular set of coordinates in three-dimensional space, the coordinates input apparatus comprising:

a frame;

an operating part tiltably positioned within the frame;

a printed circuit board supporting the frame;

an annular magnet;

a plurality of magnetoelectric transducers;

a disc-shaped magnetic plate with an aperture formed in a center thereof;

the magnet and the plurality of magnetoelectric transducers being fixedly mounted on an upper surface of the printed circuit board opposite, and spaced from, the magnetic plate, the magnet being disposed so that one pole faces the magnetic plate, the magnetic plate being disposed on a lower surface of the operating part opposite the magnet and tiltably supported by the frame via the operating part, the plurality of magnetoelectric transducers mounted on the upper surface of the printed circuit board and disposed on an interior side of the magnet and outputting voltage signals having voltage values that vary according to a change in distance between the magnetoelectric transducers and the magnetic plate, such that the voltage values indicate a set of coordinates in three-dimensional space; and a plurality of projecting flanges formed around an inner rim of the magnetic plate so as to extend toward the magnetoelectric transducers without contacting the magnetoelectric transducers.

12. A coordinates input apparatus for designating a particular set of coordinates in three-dimensional space, the coordinates input apparatus comprising:

a frame;

an operating part tiltably positioned within the frame;

a printed circuit board supporting the frame;

an annular magnet;

a plurality of magnetoelectric transducers;

a disc-shaped magnetic plate with an aperture formed in a center thereof;

the magnet and the plurality of magnetoelectric transducers being fixedly mounted on an upper surface of the printed circuit board opposite, and spaced from, the magnetic plate, the magnet being disposed so that one pole faces the magnetic plate, the magnetic plate being disposed on a lower surface of the operating part opposite the magnet and tiltably supported by the frame via the operating part, the plurality of magnetoelectric transducers mounted on the upper surface of the printed circuit board and disposed on an interior side of the magnet and outputting voltage signals indicating voltage values that vary according to a change in distance between the magnetoelectric transducers and the magnetic plate, such that the voltage values indicate a set of coordinates in three-dimensional space; and a second magnetic plate disposed on a lower surface of the printed circuit board opposite the upper surface of the printed circuit board on which the magnet and the plurality of magnetoelectric transducers are disposed.

13. A coordinates input apparatus for designating a particular set of coordinates in three-dimensional space, the coordinates input apparatus comprising:

a frame;

an operating part tiltably positioned within the frame;

a printed circuit board supporting the frame;

an annular magnet;

a plurality of magnetoelectric transducers; and a disc-shaped magnetic plate with an aperture formed in a center thereof, the plurality of magnetoelectric transducers being fixedly mounted on an upper surface of the printed circuit board opposite, and spaced from, the magnetic plate and the annular magnet, the annular magnet being disposed on a lower surface of the magnetic plate, the magnetic plate being disposed on a lower surface of the operating part and tiltably supported by the frame via the operating part, the plurality of magnetoelectric transducers outputting respective voltage signals having voltage values that vary according to a change in distance between each of the respective magnetoelectric transducers and the magnetic plate, such that the voltage values indicate a set of coordinates in three-dimensional space.

14. The coordinates input apparatus as claimed in claim 13, wherein the plurality of magnetoelectric transducers are housed within a package on an interior side of the annular magnet.

15. The coordinates input apparatus as claimed in claim 13, wherein a plurality of projecting flanges are formed around an inner rim of the magnetic plate so as to extend toward the package housing the magnetoelectric transducers without contacting the package housing the magnetoelectric transducers.

16. The coordinates input apparatus as claimed in claim 15, further comprising a second magnetic plate disposed on a lower surface of the printed circuit board opposite the upper surface of the printed circuit board on which the package housing the plurality of magnetoelectric transducers is disposed.

17. The coordinates input apparatus as claimed in claim 13, wherein the plurality of magnetoelectric transducers are Hall elements.

18. A coordinates input apparatus for designating a particular set of coordinates in three-dimensional, the coordinates input apparatus comprising:

a frame;

an operating part tiltably positioned within the frame;

a printed circuit board supporting the frame;

an annular magnet;

a plurality of magnetoelectric transducers;

a disc-shaped first magnetic plate with an aperture formed in a center thereof;

a second magnetic plate disposed on a lower surface of the printed circuit board opposite an upper surface above which the first magnetic plate is disposed; and an elastic supporting member, the elastic supporting member being disposed between the annular magnet and the first magnetic plate, the plurality of magnetoelectric transducers and the annular magnet being fixedly mounted on an upper surface of the printed circuit board opposite, and spaced from, the first magnetic plate, the first magnetic plate being disposed on a lower surface of the operating part via the elastic supporting member and tiltably supported by the elastic supporting member, the plurality of magnetoelectric transducers outputting respective voltage signals having voltage values that vary according to a change in distance between the respective magnetoelectric transducers and the magnetic plate, such that the voltage values indicate a set of coordinates in three-dimensional space.

19. The coordinates input apparatus as claimed in claim 18, wherein the plurality of magnetoelectric transducers are housed within a package, the package being disposed on an interior side of the annular magnet.

20. The coordinates input apparatus as claimed in claim 18, wherein the plurality of magnetoelectric transducers are Hall elements.

21. A coordinates input apparatus for designating a particular set of coordinates in three-dimensional space, the coordinates input apparatus comprising:

a frame;

an operating part tiltably positioned within the frame;

a printed circuit board supporting the frame;

a first annular magnet;

a plurality of magnetoelectric transducers;

a disc-shaped magnetic plate with an aperture formed in a center thereof; and a second annular magnet, disposed on a lower surface of the printed circuit board opposite an upper surface above which the first magnet and the magnetic plate are disposed, a south magnetic pole of the first annular magnet being disposed opposite a south magnetic pole of the second annular magnet with the printed circuit board disposed therebetween, the plurality of magnetoelectric transducers being fixedly mounted on an upper surface of the printed circuit board opposite the magnetic plate and the first annular magnet, the magnetic plate being disposed on a lower surface of the operating part so as to be tiltable in any direction, a repulsive force between the first annular magnet and the second annular magnet supporting the magnetic plate so as to cause the magnetic plate to push upward against the lower surface of the operating part, the plurality of magnetoelectric transducers outputting respective voltage signals having voltage values that vary according to a change in distance between the respective magnetoelectric transducers and the magnetic plate, such that the voltage values indicate a set of coordinates in three-dimensional space.

22. The coordinates input apparatus as claimed in claim 21, wherein the plurality of magnetoelectric transducer are housed in a package, the package being disposed on an interior side of the first annular magnet.

23. The coordinates input apparatus as claimed in claim 21, wherein the plurality of magnetoelectric transducers are Hall elements.

24. An apparatus to designate a set of coordinates in three-dimensional space, the apparatus comprising:

an operating part tiltably positioned in a frame that is supported by a printed circuit board;

a magnetic plate carried on a lower surface of the operating part and moving therewith;

a magnet with one pole facing the magnetic plate; and a plurality of magnetoelectric transducers on an upper surface of the printed circuit board opposite the magnetic plate and disposed around an outer rim of the magnet, wherein a tilt position of the operating part and the magnetic plate determines distances between each of the magnetoelectric transducers and the magnetic plate, and resultant levels of respective output voltage signals of the magnetoelectric transducers indicate a corresponding set of coordinates in three-dimensional space.

* * * * *